United States Patent
Boe et al.

(10) Patent No.: US 7,201,347 B2
(45) Date of Patent: Apr. 10, 2007

(54) PROCESS FOR IMPROVING THE LANDING OF AN AIRCRAFT

(75) Inventors: Régis Boe, Leguevin (FR); Philippe Seve, Toulouse (FR)

(73) Assignee: Airbus France, Toulouse (FR)

( * ) Notice: Subject to any disclaimer, the term of this patent is extended or adjusted under 35 U.S.C. 154(b) by 136 days.

(21) Appl. No.: 11/047,745

(22) Filed: Feb. 2, 2005

(65) Prior Publication Data
US 2005/0218262 A1    Oct. 6, 2005

(30) Foreign Application Priority Data
Feb. 6, 2004    (FR) ................................. 04 01134

(51) Int. Cl.
*B64C 9/00*    (2006.01)
(52) U.S. Cl. ........................................ 244/87; 244/221
(58) Field of Classification Search ................ 244/87, 244/221, 225
See application file for complete search history.

(56) References Cited

U.S. PATENT DOCUMENTS

| | | | | |
|---|---|---|---|---|
| 2,563,757 A | * | 8/1951 | Thorp | .......................... 244/87 |
| 4,043,523 A | * | 8/1977 | Bartoe, Jr. | .................... 244/87 |
| 4,261,533 A | * | 4/1981 | Roberts et al. | ............. 244/7 R |
| 4,291,853 A | | 9/1981 | Sigalla | |
| 4,790,494 A | | 12/1988 | Kohn | |
| 5,707,029 A | * | 1/1998 | McIntosh | .................... 244/225 |
| 5,779,191 A | | 7/1998 | Brislawn | |
| 2002/0121575 A1 | | 9/2002 | Greene | |

FOREIGN PATENT DOCUMENTS

EP    0809165    11/1997

* cited by examiner

*Primary Examiner*—Teri Pham Luu
*Assistant Examiner*—Joseph W. Sanderson
(74) *Attorney, Agent, or Firm*—Stevens, Davis, Miller & Mosher, LLP

(57) ABSTRACT

A process for improving the landing of an aircraft may include, prior to the aircraft contacting the ground, nose-up under-deflecting the aircraft's adjustable horizontal tail plane and nose-up deflecting the elevators. This arrangement increases the maximum nosedown swing of the elevators to increase the ability of the elevators to make the nose of the aircraft tilt downwards.

2 Claims, 3 Drawing Sheets

PROCESS FOR IMPROVING THE LANDING OF AN AIRCRAFT

FIELD OF THE INVENTION

The present invention relates to a process for improving the landing of an aircraft.

BACKGROUND OF THE RELATED ART

It is known that certain aircraft comprise a stabilizing horizontal tail plane that can be adjusted in inclination. An adjustable horizontal tail plane such as this is, in the art, designated by one or other of the abbreviations PHR (standing for Plane Horizontal Réglable [i.e., adjustable]) or THS (standing for Trimmable Horizontal Stabilizer). Just like a fixed horizontal tail plane, an adjustable horizontal tail plane is provided with elevators forming the trailing edge of said adjustable horizontal tail plane.

An adjustable horizontal tail plane can be deflected in the nose-up or nose-down direction and it is used in certain flight phases. For example, during the landing of the aircraft, it is customary to nose-up deflect said adjustable horizontal tail plane through action of the pilot or of an automatic system, said elevators being in direct aerodynamic alignment with said tail plane and the value of the angle of deflection of the adjustable horizontal tail plane depending on several parameters of the aircraft, such as the longitudinal position of the center of gravity, the total weight on landing, the configuration of the leading edge slats and of the trailing edge flaps, the thrust, the speed at the moment of landing, etc.

This value of the angle of deflection is significant since it conditions the behavior of the airplane during the phase of the landing flare-out and of the making of contact of the aircraft with the ground.

After this making of contact of the aircraft with the ground, the elevators attached to the adjustable horizontal tail plane are controlled by the pilot of the aircraft so as to take, from their position in direct aerodynamic alignment with said tail plane, a position in the nose-down direction so as to tilt down, about the main landing gear, the nose of said aircraft rolling over the ground. Thus, the front gear (which is located under the nose) may, in its turn, make contact with the ground.

It may happen that, under certain conditions of the aircraft and/or of the outside environment, the elevators do not have sufficient authority to make the nose of the aircraft tilt rapidly downwards, so that the latter rolls over the ground for some time with its nose raised and the front gear not in contact with the ground, thereby causing a delay in braking.

SUMMARY OF THE INVENTION

An object of the present invention is to remedy this drawback.

To this end, according to the invention, the process for improving the landing of an aircraft comprising an adjustable horizontal tail plane to which are hinged elevators, said adjustable horizontal tail plane being nose-up deflected by an angle of inclination of predetermined value with a view to the making of contact of said aircraft with the ground and said elevators being nose-down deflected after said making of contact so as to tilt down the nose of said aircraft rolling over the ground, is noteworthy in that, prior to said making of contact of said aircraft with the ground:

said adjustable horizontal tail plane is deflected, in the nose-up direction, with a lower actual value of angle of inclination than a value corresponding to a customary configuration in which said elevators are in direct aerodynamic alignment with said adjustable horizontal tail plane; and said elevators are deflected in the nose-up direction, in such a way that the combination of the nose-up action of said adjustable horizontal tail plane and of the nose-up action of said elevators engenders a nose-up resultant aerodynamic force which is at least approximately equal to that engendered by the assembly of said adjustable horizontal tail plane and of said elevators in said customary configuration.

Thus, by virtue of the present invention, for an aerodynamic action preceding the making of contact of the aircraft with the ground, equivalent to that customarily obtained, the position of the elevators from which the nose-down deflection thereof will be performed after said making of contact is shifted towards the nose-up values. Consequently, the nose-down deflection travel of said elevators with respect to said adjustable horizontal tail plane is increased, thereby, of course, augmenting the authority of the elevators to make the nose of the aircraft tilt downwards.

Experiments and calculations have shown that, for the AIRBUS A380 wide-bodied airplane, a decrease of 5° in the angle of inclination of the adjustable horizontal tail plane, with respect to said customary configuration, brings about a shift of 10° in the nose-up direction of the elevators.

Preferably, the decreasing of the angle of nose-up inclination of said adjustable horizontal tail plane, equal to the difference between said value corresponding to the customary configuration and said actual value, is chosen to bring about an increase of the maximum nose-down swing of sails elevators most equal to a third of the maximum nose-up swing that said elevators exhibit in said customary configuration.

BRIEF DESCRIPTION OF THE DRAWINGS

The figures of the appended drawing will elucidate the manner in which the invention may be embodied. In these figures, identical references denote similar elements.

DETAILED DESCRIPTION OF THE INVENTION

Figure 1:
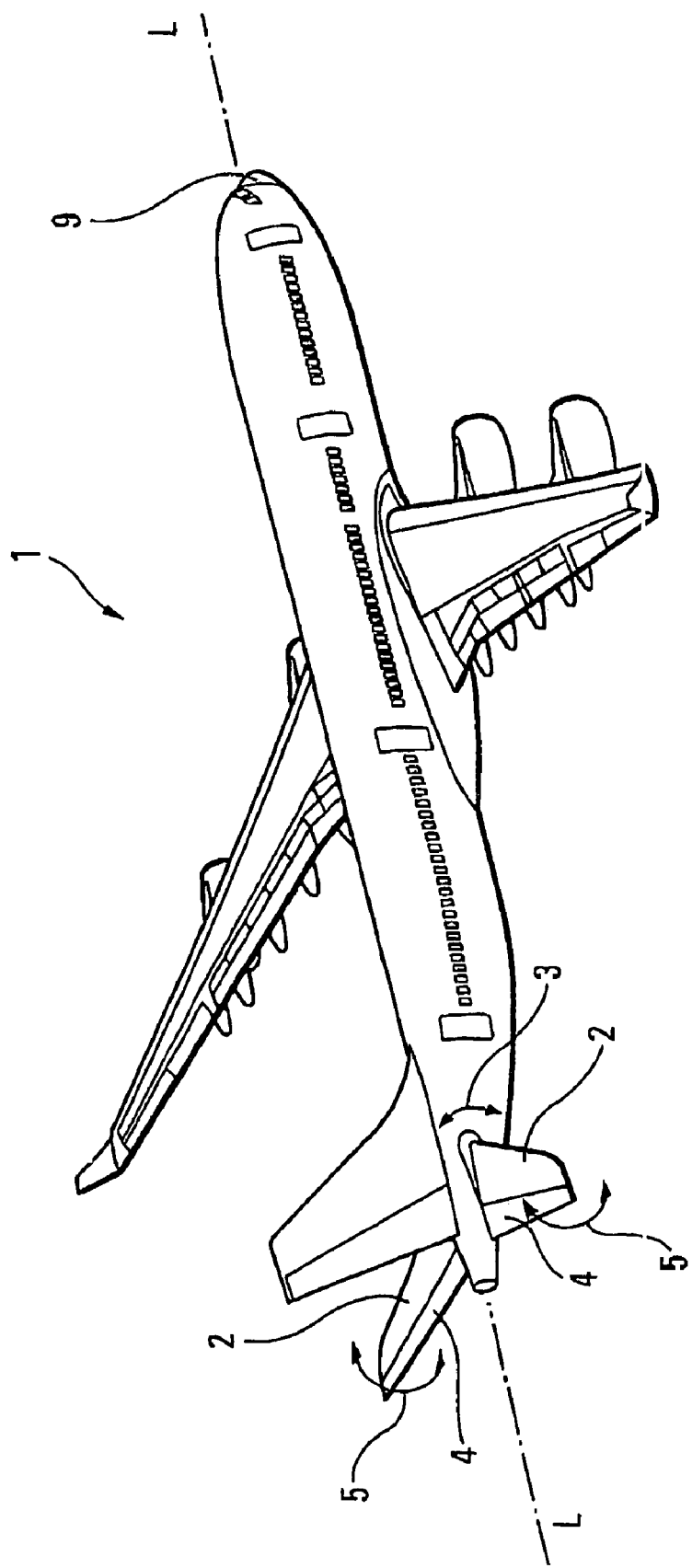
FIG. 1 shows, in diagrammatic perspective, a wide-bodied civil aircraft provided with an adjustable horizontal tail plane.

The wide-bodied airplane 1, shown diagrammatically by FIG. 1, exhibits a longitudinal axis L—L and comprises a horizontal tail plane 2 that can be adjusted in inclination, as is illustrated by the double arrow 3. To the rear edge of said adjustable horizontal tail plane 2 are hinged elevators 4 that can turn with respect to said tail plane 2, as is illustrated by the double arrow 5.

Figure 2:
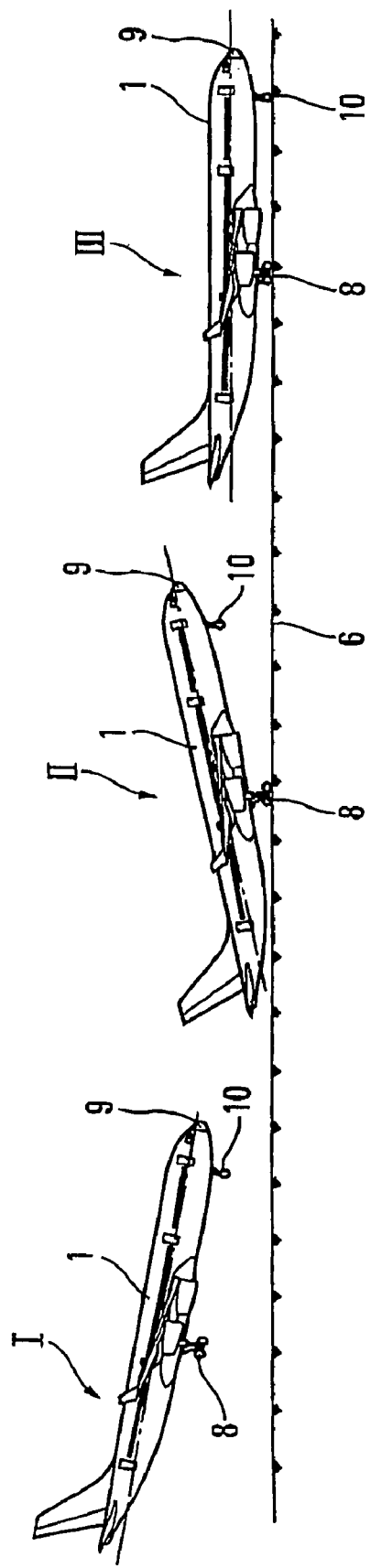
FIG. 2 illustrates, in three successive positions, said aircraft's landing phase.

Illustrated in FIG. 2 are three situations I, II and III experienced by said airplane 1 during its landing.

In situation I, the aircraft terminates its flare-out while approaching the ground 6. During this end of flare-out, in the customary technique, the adjustable horizontal tail plane 2 is inclined by an angle iH1 with respect to said longitudinal axis L—L and the elevators 4 are in a position which is in direct aerodynamic alignment with said adjustable horizontal tail plane 2 with a maximum nose-up swing dC and a maximum nose-down swing dP (see FIG. 3A). In this customary configuration, the assembly of said adjustable horizontal tail plane 2 and of the elevators 4 engenders a nose-up aerodynamic forces F.

After the aircraft 1 makes contact with the ground (situation II in FIG. 2), the latter, by virtue of its main gear 8, rolls over the ground 6 with its nose 9 directed upward. Also, in customary fashion, to make the nose 9 tilt towards the ground 6, the pilot actuates the elevators 4 so as to make them take a nose-down position, as represented in FIG. 3B. Thus, the nose 9 can tilt toward the ground 6 and the front gear 10 can touch the ground in its turn (situation III in FIG. 2).

However, as mentioned hereinabove, it may happen that the nose-down authority of the elevators 4 is insufficient—even if the latter are nose-down deflected by the angle corresponding to the maximum swing dP, as is represented in FIG. 3B—to make the nose 9 tilt rapidly toward the ground. In this case, the aircraft 1 rolls over the ground 6 for some time in situation II, before being able to adopt situation III.

Figure 4A:
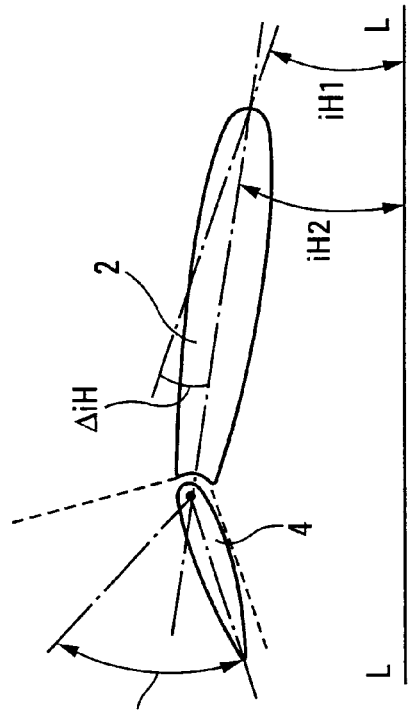
FIGS. 4A and 4B show an example of positioning, in accordance with the invention, of the adjustable horizontal tail plane and of the elevators, respectively before and starting from the making of contact with the ground.
Figure 4B:
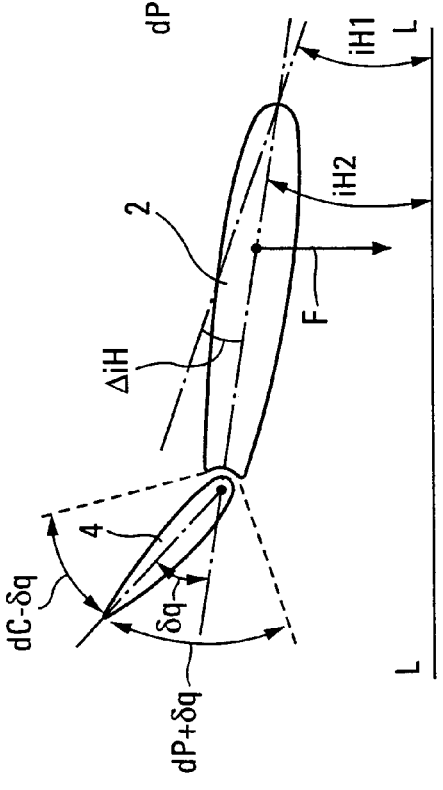

To remedy this drawback, the present invention operates in the manner illustrated in FIGS. 4A and 4B, namely:

during the flare-out illustrated by situation I of FIG. 2, the adjustable horizontal tail plane 2 is inclined by a nose-up angle iH2, less than the angle iH1 by a quantity ΔiH, and simultaneously, the elevators 4 are nose-up deflected so as to take a nose-up angle δq with respect to said tail plane 2.

Figure 3A:
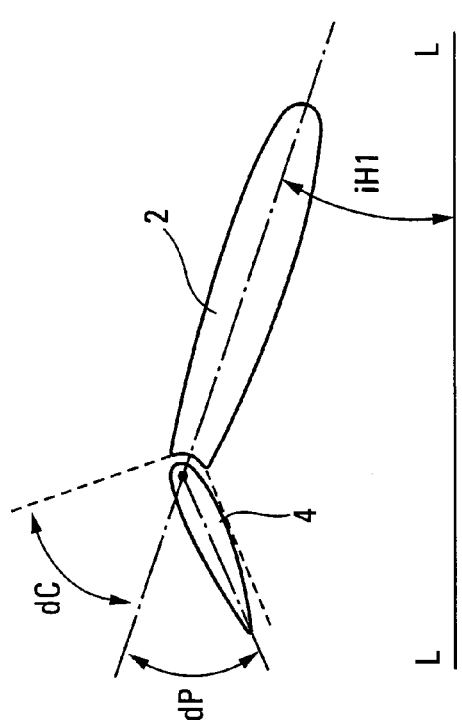
FIGS. 3A and 3B show the customary positioning of the adjustable horizontal tail plane and of the elevators which are attached thereto, respectively before and starting from the making of contact with the ground.
Figure 3B:
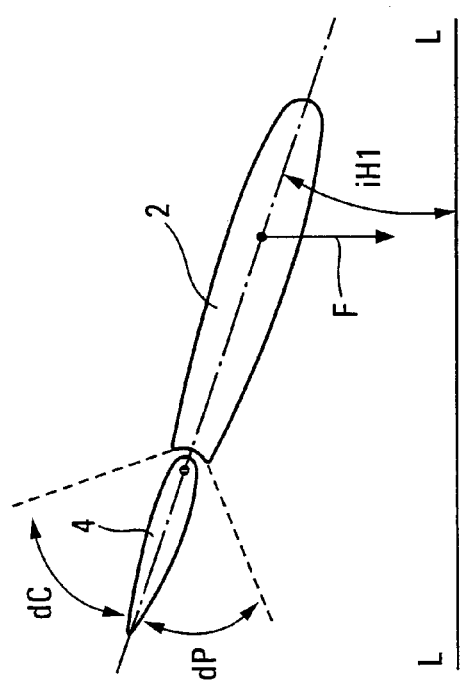

In this procedure, illustrated by FIG. 4A, the angles iH2 and δq are chosen such that the nose-up aerodynamic force engendered by the combination of the adjustable horizontal tail plane 2 and of the elevators 4 is at least approximately equal to the aerodynamic force F of the configuration of FIG. 3A.

As a result of the foregoing, the maximum nose-down swing of the elevators 4 is increased by δq and becomes dP+δq (see FIG. 4AB).

By virtue of such an increase in the maximum nose-down swing, the elevators acquire the necessary authority to make the nose 9 tilt rapidly toward the ground 6.

Thus, in the configuration in accordance with the present invention illustrated by FIGS. 4A and 4B, the elevators 4 have, after the making of contact with the ground, greater tilting authority than that which they have in the customary configuration of FIGS. 3A and 3B.

Moreover, in order that the aircraft 1 should retain a possible authority to nose-up in case of need, care is taken that the increase δq in the maximum nose-down swing is at most equal to a third of the maximum nose-up swing dC, in the customary configuration.

The invention claimed is:

1. A process for improving the landing of an aircraft comprising an adjustable horizontal tail plane to which are hinged elevators, said adjustable horizontal tail plane being nose-up deflected by an angle of inclination of predetermined value with a view to the making of contact of said aircraft with the ground and said elevators being nose-down deflected after said making of contact so as to tilt down the nose of said aircraft rolling over the ground, said method comprising, prior to said making of contact of said aircraft with the ground:

deflecting said adjustable horizontal tail plane, in the nose-up direction, with a lower actual value of angle of inclination than a value corresponding to a customary configuration in which said elevators are in direct aerodynamic alignment with said adjustable horizontal tail plane; and deflecting said elevators, in the noseup direction, in such a way that the combination of the nose-up action of said adjustable horizontal tail plane and of the nose-up action of said elevators engenders a noseup resultant aerodynamic force which is at least approximately equal to that engendered by the assembly of said adjustable horizontal tail plane and of said elevators in said customary configuration so that a dissymmetry in the authority of said elevators is generated, increasing said authority in the nose-down direction and reducing said authority in the nose-up direction.

2. The process as claimed in claim 1, wherein the decreasing of the angle of nose-up inclination of said adjustable horizontal tail plane, equal to the difference between said value corresponding to the customary configuration and said actual value, brings about an increase of the maximum nose-down swing of said elevators at most equal to a third of the maximum nose-up swing that said elevators exhibit in said customary configuration.

* * * * *